United States Patent [19]
Kasahara et al.

[11] Patent Number: 5,218,524
[45] Date of Patent: Jun. 8, 1993

[54] OPTICAL DISK APPARATUS

[75] Inventors: Akihiro Kasahara, Kawasaki; Hideo Yamasaki; Takashi Yoshizawa, both of Yokohama; Sou Ishika, Kawasaki, all of Japan

[73] Assignee: Kabushiki Kaisha Toshiba, Kawasaki, Japan

[21] Appl. No.: 784,520

[22] Filed: Oct. 29, 1991

[30] Foreign Application Priority Data

Oct. 31, 1990 [JP] Japan .................. 2-293863

[51] Int. Cl.$^5$ .............................. G11B 7/00
[52] U.S. Cl. ................... 369/100; 369/110; 369/119
[58] Field of Search ............... 369/100, 110, 116, 119, 369/114; 359/489

[56] References Cited

U.S. PATENT DOCUMENTS

| 4,571,650 | 2/1986 | Ojima et al. | 369/110 |
| 4,813,032 | 3/1989 | Koyama | 369/110 |
| 4,863,246 | 9/1989 | Anthon | 364/110 |
| 4,894,815 | 1/1990 | Yamanaka | 369/110 |

FOREIGN PATENT DOCUMENTS

| 339940 | 2/1989 | European Pat. Off. |
| 1-282746 | 5/1988 | Japan |

OTHER PUBLICATIONS

Patent Abstracts of Japan, vol. 10, No. 124, (P-454) (2181), May 9, 1986 & JP-A-60-251525, (Canon K.K.), Dec. 12, 1985.
Patent Abstracts of Japan, vol. 10, No. 195, (P-475) (2251), Jul. 9, 1986 & JP-A-61-039242, (Hitachi Maxell Ltd.), Feb. 25, 1986.

*Primary Examiner*—Paul M. Dzierzynski
*Assistant Examiner*—Kiet T. Nguyen
*Attorney, Agent, or Firm*—Finnegan, Henderson, Farabow, Garrett & Dunner

[57] ABSTRACT

An optical disk apparatus has a light source, light focusing means for focusing the light beam to a recording film of an optical disk light reception means for receiving a reflected light beam from the recording film, and optical axis adjustment means arranged in an optical path between the light source and the light focusing means and for adjusting a dislocation of the optical axis of the light beam from the optical center axis of the light focusing means. The optical axis adjustment means has an light transmissive flat plate having parallel surfaces which are installed diagonally to the optical axis, or with the light transmissive flat plate and means which supports the light transmissive flat plate and inclines rotatably the direction of the light transmissive flat plate around two axes by turning a curved surface seat thereof.

6 Claims, 4 Drawing Sheets

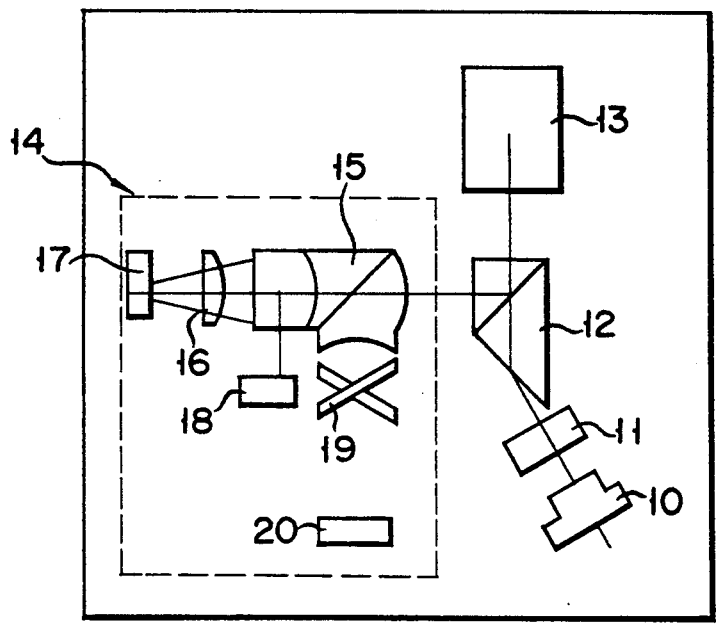
F I G. 1
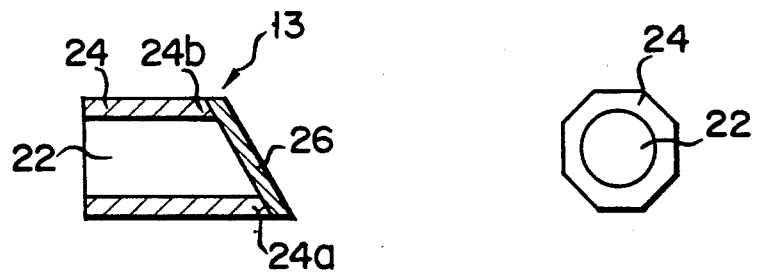
F I G. 2A         F I G. 2B

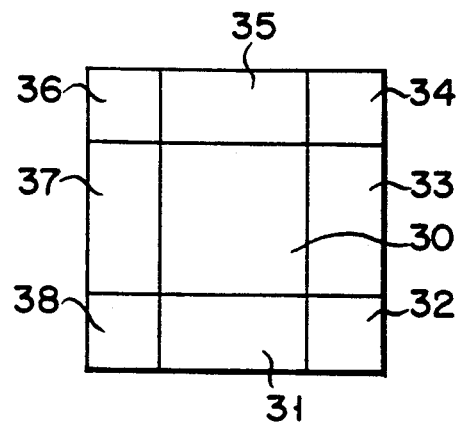
F I G. 3A
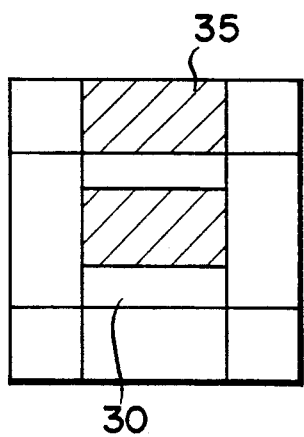
F I G. 3B
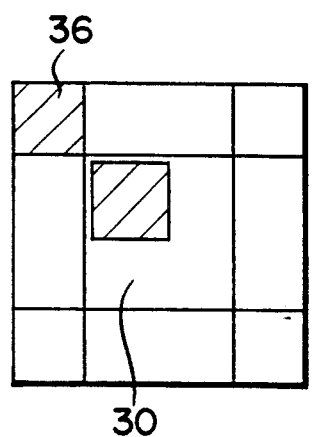
F I G. 3C
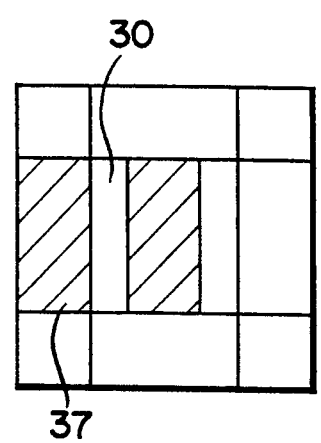
F I G. 3D
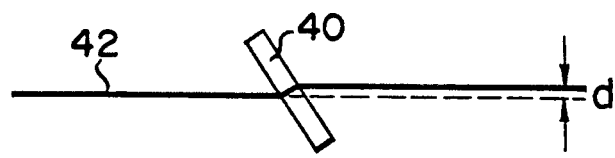
F I G. 4

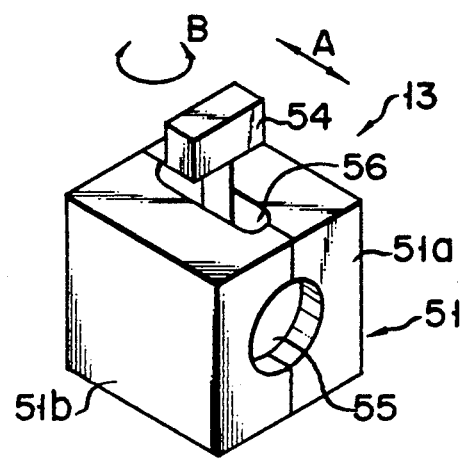
F I G. 5
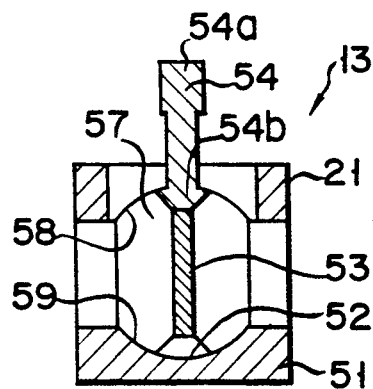
F I G. 6

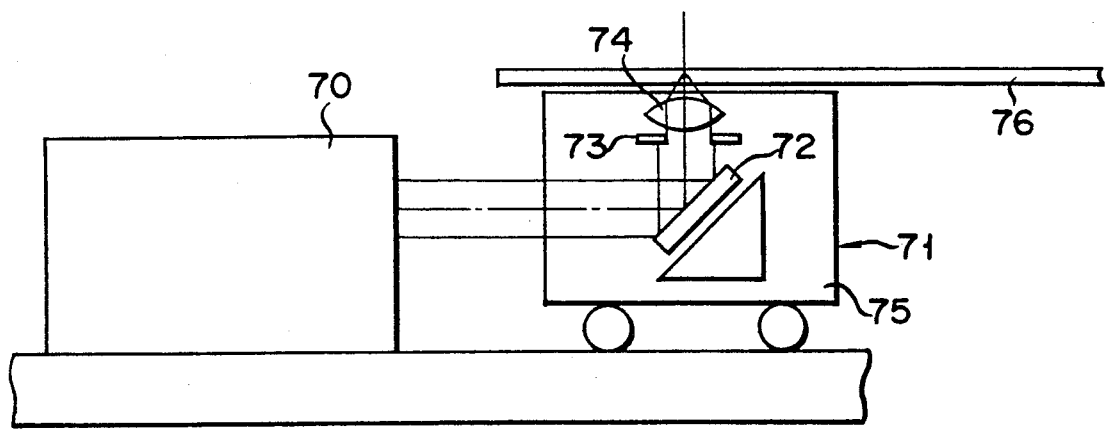
FIG. 7  PRIOR ART
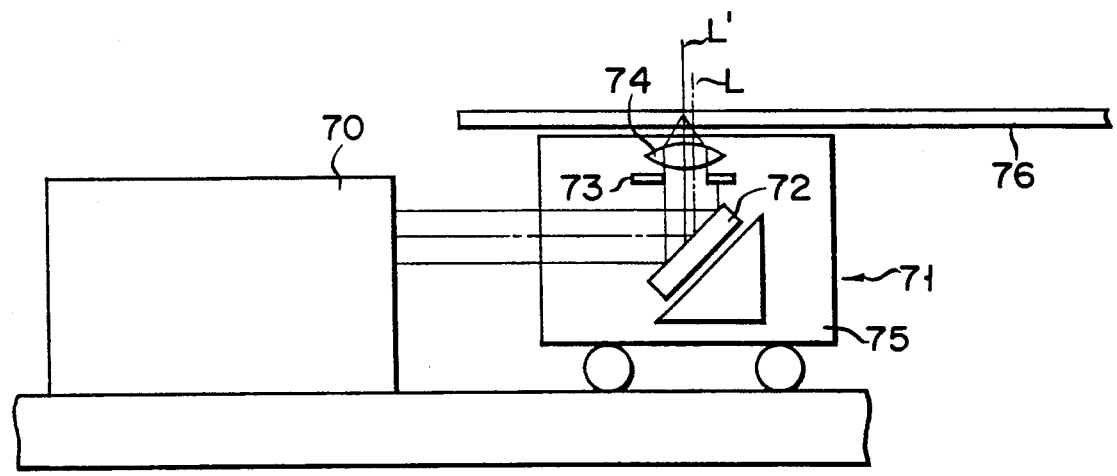
FIG. 8  PRIOR ART
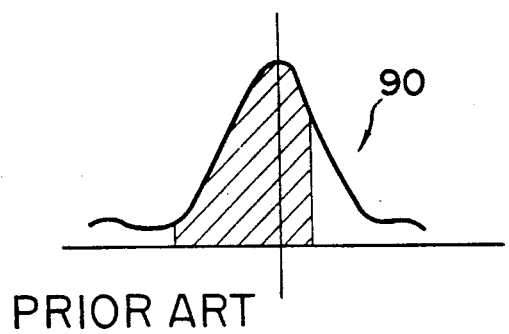
PRIOR ART  FIG. 9

OPTICAL DISK APPARATUS

BACKGROUND OF THE INVENTION

1. Field of the Invention

The present invention relates to an optical disk apparatus and, more particularly, to an optical disk apparatus capable of adjusting a dislocation of an optical axis.

2. Description of the Related Art

A prior art optical disk apparatus using a separate optical-type access mechanism has such a structure as shown in FIG. 7. In FIG. 7, numeral 70 designates a stationary optical unit. On the side of the stationary optical unit 70, a mobile optical unit 71 is installed to scan an optical disk. The mobile optical unit 71 comprises a rotary mirror 72, a lens stop 73 and an object lens 74, which are loaded onto a carriage 75. An optical disk 76 is arranged above the mobile optical unit 71.

In the optical disk apparatus, a laser beam launched from the stationary optical unit 70 is first irradiated to the rotary mirror 72. The laser beam is reflected by the rotary mirror 72 to cause its optical direction to be changed about 90 degrees. Then, the laser beam passes through the lens iris 73, and is focused by the objective lens 74 to be focused on a recording film of the optical disk 76. The beam reflected by the recording film is changed in its optical axis direction, passes through its original path, and returns to the stationary optical unit 70. The reflected beam is detected by a photo-detector (not shown) in the stationary optical unit 70, thereby causing a signal having been previously recorded in the recording film to be read.

However, in the prior art optical disk apparatus, as shown in FIG. 8, a dislocation occurs between the optical axis of the laser beam launched from the stationary optical unit 70 and the optical center axis of the mobile optical unit 71. That is, a problem exists in that the optical axis L of the laser beam changed in direction by the rotary mirror 72 is dislocated from the optical center axis L' of an optical system consisting of the lens stop 73 and the objective lens 74 of the mobile optical unit 71.

When such dislocation occurs, an intensity distribution 90 of the beam irradiated to the recording film of the optical disk becomes asymmetric as shown in FIG. 9. When the intensity distribution of the beam becomes asymmetric, an offset occurs in tracking error signal and focus error signal during operation. A problem has existed in that, if the asymmetry becomes as extreme as exceeds an allowable range, the control operation of the object lens, that is, the accurate positioning of the object lens cannot be performed, thereby causing signals not be read stably. In the prior art optical disk apparatus, a control to make the dimensional accuracy of each parts higher has been performed to solve such problems, but such problems have not completely solved.

SUMMARY OF THE INVENTION

The present invention has been devised with consideration to such problem, and the object thereof is to provide an optical disk apparatus capable of adjusting a dislocation of the optical axis of light beam from the optical center axis of an optical system where the light beam is focused by a recording film.

The object can be achieved by an optical disk apparatus provided with a light source, light focusing means for focusing the light beam to a recording film of an optical disk, light reception means for receiving a reflected light beam from the recording film, and optical axis adjustment means arranged in an optical path between the light source and the light focusing means and for adjusting a dislocation of the optical axis of the light beam from the optical center axis of the light focusing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view showing part of an optical disk apparatus of the present invention;

FIGS. 2A and 2B are schematic, illustrative views of means for adjusting the optical axis of an optical disk apparatus of the present invention;

FIGS. 3A through 3D are illustrative views to help explain a dislocation of the optical axis;

FIG. 4 is a view to help explain a dislocating of the optical axis by an optically transmissive flat plate;

FIG. 5 is a perspective view of a dislocation adjustment mechanism for adjusting the optical axis of an optical disk apparatus of the present invention;

FIG. 6 is a sectional view of the dislocation adjustment mechanism shown in FIG. 5;

FIGS. 7 and 8 are schematic, illustrative views showing a prior art optical disk apparatus; and FIG. 9 is an illustrative graph showing an asymmetric intensity distribution of a light beam by the optical axis dislocation.

DETAILED DESCRIPTION OF THE PREFERRED EMBODIMENTS

With reference to the drawings, one embodiment of an optical disk apparatus according to the present invention will be specifically explained hereinafter.

FIG. 1 is a schematic plan view showing a stationary optical unit of an optical disk apparatus of the present invention. In FIG. 1, numeral 10 designates a laser diode. On the downstream side of the laser diode 10, is arranged a collimator lens 11. On the downstream of the collimator lens 11, is arranged a first composite prism 12 being polarization means. On the downstream side of the first composite prism 12 which is in the proceeding direction of a light beam, is arranged an optical axis adjustment block 13. On the downstream side of the optical axis adjustment block 13, is arranged a mobile optical unit (not shown) (above the stationary optical unit in FIG. 1). On the downstream side of the first composite prism 12 which is in the proceeding direction of a reflected beam, is arranged a light reception unit 14. The light reception unit 14 comprises a second composite prism 15 for passing the reflected light having come through the first composite prism 12, a first photo-detector 17 for detecting the reflected light through a focusing lens 16, a second photo-detector 18 for detecting directly the reflected light, and a third photo-detector 20 for detecting the reflected light through a cross flat plate 19.

FIG. 2A is a sectional view showing an example of the optical axis adjustment block 13. The optical axis adjustment block 13 comprises a block body 24 having a hollow section 22 and whose sectional outline is a regular octagon as shown in FIG. 2B, and an light transmissive flat plate 26 having parallel surfaces mounted on one end of the block body 24. The material of the light transmissive flat plate 26 may employ optical glass or light transmissive plastics such as acrylic resin and the like. The thickness of the optically transmissive flat plate 26 is preferably a range of 0.5 to 2 mm. This is because when the thickness of the light transmissive flat plate 26 is 0.5 mm or less, it is necessary to obtain larger inclined angle in order to gain a distance (about 0.2 mm) which the optical axis moves, as a result, changes the polarizing properties of the P wave and the S wave, and when the thickness of the light transmissive flat plate 26 exceeds 1 mm, it becomes difficult to perform the mounting. Preferable thickness is 1 mm. The block body 24 is formed in a manner to have an acute angle part 24$a$ and an obtuse angle part 24$b$, whereby the light transmissive flat plate 26 is mounted in a manner to have a specified angle to the center axis of the block body 24, that is, to the normal of optical axis. The angle is preferably a range of 0 to 45 degrees. This is because when the angle is exceeds 45 degrees, it becomes the polarizing property between the P wave and the S wave is changed. Particularly preferable angle is 30 degrees.

Although the section of the optical axis adjustment block 13 may have any shape such as a regular polygon and a circle, a regular octagon is preferable with respect to adjustment workability and the like.

The operation of the optical disk apparatus having such composition will be explained hereinafter.

A laser beam launched from the laser diode 10 passes through the collimator lens 11 to become a parallel beam. The parallel beam passes through the first composite prism 12, thereby causing its intensity distribution to be polarized from an ellipse shape to a circular shape. The polarized beam passes through the optical axis adjustment block 13 to cause its optical axis position to be corrected, and irradiated to a mobile optical unit (not shown). The laser beam directed to an optical disk by the mobile optical unit is focused on a recording film, where the beam is then reflected to become a reflected beam. The reflected beam passes through the same path and the mobile optical unit, and returns to the stationary optical unit. In the stationary optical unit, the reflected beam passes through the first composite prism 12 and is detected by the first, second and third photo-detectors 17, 18 and 20 of the light reception unit 14. The reflected beam proceeds from the first composite prism 12 toward not the laser diode 10 but the second composite prism 15.

A case where the optical axis is adjusted by the use of the optical axis adjustment block 13 will be explained hereinafter.

First, a dislocation of the optical axis is examined without using the optical axis adjustment block 13. In order to define the dislocated amount and direction of the optical axis, for convenience, the position of the optical axis is divided into nine regions as shown in FIG. 3A. In FIG. 3A, the region indicated with numeral 30 is an allowable region which has no interference with the control operation of the objective lens in the mobile optical unit. In FIG. 3A, the regions indicated with numerals 31 through 38 are regions which exceed the allowable region and have an interference with the control operation of the objective lens in the mobile optical unit.

For example, where the position of the optical axis is in the region 35, that is, dislocated upward as shown in FIG. 3B, an acute angle part 24$a$ of the optical axis adjustment block 24 is allowed to turn in a manner to be located upward for positioning. This allows the position of the optical axis to be housed from the region 35 into the region 30. In a similar manner to the above, where the position of the optical axis is in the regions 36 and 37, that is, dislocated diagonally upward and sideward, respectively, as shown in FIGS. 3C and 3D, an obtuse angle part 24$a$ of the optical axis adjustment block 24 is allowed to turn in a manner to be located diagonally upward and sideward, respectively, for positioning. This allows the position of the optical axis to be housed from the regions 36 and 37 into the region 30. In this manner, even if the position of the optical axis is dislocated in any direction, the position can be housed into the allowable region. As a result, the dislocation of the optical axis of the laser beam from the optical center axis of the focusing means in the mobile optical unit can be corrected.

The optical disk apparatus is provided with means for adjusting a dislocation of the optical axis of the laser beam from the optical center axis of the focusing means by the use of an optically transmissive flat plate having parallel surfaces.

When a light beam 42 is allowed to be irradiated at a specified angle to an optically transmissive flat plate 40 as shown in FIG. 4, the optical axis of the light beam will be dislocated by d. By utilizing this principle, an optical axis which is beyond the allowable region of the dislocation of the optical axis of the light beam from the optical center axis of the focusing means can be housed in the allowable region. This allows a write and playback operation to be performed stably.

With reference to the drawings, another embodiment of an optical disk apparatus according to the present invention will be explained hereinafter.

FIG. 5 is a perspective view showing another example of the optical axis adjustment block 13. FIG. 6 is a sectional view of the optical axis adjustment block 13 shown in FIG. 5. The optical axis adjustment block 13 comprises a holder 51, a rotator 52, an optically transmissive flat plate 53 and a lever 54. The holder 51 is assembled by placing a holder piece 51$a$ opposite a holder piece 51$b$, and at this point, an optically transmissive hole 55 o the side surface of the holder 51 and a slit 56 on the upper surface of the holder 51 are formed. The holder 51 has a space section 57 inside, and an upper surface 58 and a bottom surface 59 of the space section 57 are formed in a concavely curved condition. The rotator 52 has a curved bottom surface which is in contact with the bottom surface 59 of the space section 57 through a substantially same curved surface. The rotator 52 also supports one end of the optically transmissive flat plate 53. The lever 54 comprises a knob part 54$a$ and a grasp part 54$b$, and the knob part 54$a$ is inserted into a slit 56 in a manner to be moved in the slit 56 and the grasp part 54$b$ grasps the other end of the optically transmissive flat plate 53. The grasp part 54$b$ has a curved surface which is in contact with the upper surface 58 of the space section 57 through a substantially same curved surface. This requires a small friction coefficient material for the holder 51 and the lever 54 to make the motion of the lever S4 smooth. Such material includes polyethylene sulfide, liquid crystal polymer and the like.

With reference to FIG. 1, the operation of the optical disk apparatus having such composition will be explained.

The laser beam launched from the laser diode 10 passes through the collimator lens 11 to become a parallel beam. The parallel beam passes through the first composite prism 12, thereby causing its intensity distribution to be polarized from an ellipse shape to a circular shape. The polarized beam passes through the optical axis adjustment block 13 to cause its optical axis position to be corrected, and irradiated to a mobile optical unit (not shown). At this point, bringing down the lever 54 in the arrow A direction shown in FIG. 5 causes the curved surface of the grasp part 54b of the lever 54 and the curved bottom surface of the rotator 52 to slide over the upper surface 58 and the bottom surface 59 of the space section 57, respectively, thereby changing the direction of a first axis of the optically transmissive flat plate 53. Turning the lever 54 in the arrow B direction shown in FIG. 5 causes the direction of a second axis of the optically transmissive flat plate 53 to be changed. In this manner, the optically transmissive flat plate 53 can be inclined in an arbitrary direction. Thus, even if the position of the optical axis is dislocated in any direction, the position can be housed into the allowable region.

The laser beam directed to an optical disk by the mobile optical unit is focused on a recording film, where the beam is then reflected to become a reflected beam. The reflected beam passes through the same path and the mobile optical unit, and returns to the stationary optical unit. In the stationary optical unit, the reflected beam passes through the first composite prism 12 and is detected by the first, second and third photodetectors 17, 18 and 20 of the tight reception unit 14. The reflected beam proceeds from the first composite prism 12 toward not the laser diode 10 but the second composite prism 15. As a result, while the dislocation of the optical axis of the laser beam from the optical center axis of the focusing means in the mobile optical unit is corrected, a write and playback operation of information can be performed.

The optical disk apparatus is provided with a dislocation adjustment mechanism including an optically transmissive flat plate having parallel surfaces for adjusting the dislocation of the optical axis of the laser beam from the light source from the optical center axis of the focusing means and means for changing the operation of the optically transmissive flat plate to that around two axes.

In this case also, when the light beam 42 is allowed to be irradiated at a specified angle to the optically transmissive flat plate 40 as shown in FIG. 4, the optical axis of the light beam will be dislocated by d. By utilizing this principle to move the direction of the optically transmissive flat plate 40 toward two axes direction, an optical axis which is beyond the allowable region of the dislocation of the optical axis of the light beam from the optical center axis of the focusing means can be housed in the allowable region. This allows a write and playback operation to be performed stably.

As described above, the optical disk apparatus of the present invention has a high reliability such that it can adjust the dislocation of the optical axis of the light beam from the optical center axis of an optical system where the light beam is focused by a recording film, and can perform stably a write and playback operation.

Having described the optical disk apparatus using a separate optical type access mechanism in this embodiment, the present invention is not limited to such type, and can be applied to other types of optical disk apparatus.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An optical disk apparatus comprising:
   generating means for generating a light beam, the generating means having a first optical axis;
   focusing means for focusing the light beam and for irradiating an optical disk with the light beam, the focusing means defining a second optical axis;
   a block body situated between the generating means and the focusing means; and
   a light transmissive flat plate mounted to the block body and being movable relative to the block body to align the first and second optical axes with each other, the light transmissive flat plate having a thickness of about 0.5 mm to 2 mm.

2. An optical disk apparatus according to claim 1, wherein the block body is a cylindrical member having at least one opening, and the light transmissive flat plate is attached to the one opening such that a surface of the plate is inclined toward the first optical axis.

3. An optical disk apparatus according to claim 2, wherein the cylindrical member has an octagonal cross section.

4. An optical disk apparatus according to claim 1, wherein said light transmissive flat plate is made of acrylic resin.

5. An optical disk apparatus according to claim 1, wherein said block body comprises:
   a holder having a concave inner upper wall and concave inner bottom surface;
   a rotor having a curved bottom surface sliding along the inner bottom surface of the holder;
   a lever having a curved surface sliding along the inner upper wall of the holder; and
   wherein the lever and the rotor cooperate to support the light transmissive flat plate.

6. An optical disk apparatus according to claim 5, wherein each of the holder and the lever is made of a material selected from the group consisting of polyethylenesulfide and liquid crystal polymer.

* * * * *